(12) United States Patent
Potier et al.

(10) Patent No.: US 12,359,697 B2
(45) Date of Patent: Jul. 15, 2025

(54) TORQUE TRANSMISSION DEVICE

(71) Applicant: Goodrich Actuation Systems SAS, Vernon (FR)

(72) Inventors: Karl Potier, Aix en Provence (FR); Raphael Medina, Pierrefitte sur Seine (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 18/511,258

(22) Filed: Nov. 16, 2023

(65) Prior Publication Data
US 2024/0167520 A1  May 23, 2024

(30) Foreign Application Priority Data
Nov. 23, 2022 (EP) .................................. 22209115

(51) Int. Cl.
*F16D 7/02* (2006.01)
*B64C 13/50* (2006.01)

(52) U.S. Cl.
CPC .............. *F16D 7/027* (2013.01); *B64C 13/50* (2013.01)

(58) Field of Classification Search
CPC .......... F16D 7/027; F16D 13/58; B64C 13/50
See application file for complete search history.

(56) References Cited

U.S. PATENT DOCUMENTS

| | | | |
|---|---|---|---|
| 3,680,673 A | 8/1972 | Webb | |
| 6,206,161 B1* | 3/2001 | Ross | F16D 25/0638 192/48.91 |
| 6,744,162 B2 | 6/2004 | Pierre et al. | |

(Continued)

FOREIGN PATENT DOCUMENTS

| | | | |
|---|---|---|---|
| AT | 212648 B | | 12/1960 |
| JP | 2003021170 A | * | 1/2003 |

(Continued)

OTHER PUBLICATIONS

Abstract for JP2008144850 (A), Published: Jun. 26, 2008, 1 page.

(Continued)

*Primary Examiner* — Valentina Xavier
(74) *Attorney, Agent, or Firm* — CANTOR COLBURN LLP

(57) ABSTRACT

A device for selectively transmitting torque between an input shaft and an output shaft includes: a first plurality of friction disks configured to rotate with the input shaft; a second plurality of friction disks configured to rotate with the output shaft and interdigitated with the first plurality of friction disks; a plurality of roller disks wherein each of the plurality of roller disks includes a first disk-to-roller interface with one of the first plurality of friction disks and a second disk-to-roller interface with one of the second plurality of friction disks; a first resilient member configured to provide a force ($F_{SPR}$) through the first and second plurality of friction disks and roller disks; a solenoid configured to overcome the force ($F_{SPR}$) from the resilient member when energised. the device may be selectively placed in one of a first mode and a second mode depending on torque requirements.

14 Claims, 5 Drawing Sheets

(56) References Cited

U.S. PATENT DOCUMENTS 7,690,597 B2    4/2010   Cavalier et al.

FOREIGN PATENT DOCUMENTS

JP   2008144850 A   6/2008
WO   2013162734 A1  10/2013

OTHER PUBLICATIONS

Abstract of JP2003021170 (A), Published: Jan. 24, 2003, 1 page.
European Search Report for Application No. 22209115.9, mailed May 3, 2023, 7 pages.
Google Translation of JP2003021170 (A), Published: Jan. 24, 2003, 10 pages.

* cited by examiner

TORQUE TRANSMISSION DEVICE

CROSS REFERENCE TO RELATED APPLICATIONS

This application claims priority to European Patent Application No. 22209115.9 filed Nov. 23, 2022, the entire contents of which is incorporated herein by reference.

TECHNICAL FIELD

The present disclosure relates to torque transmission devices arranged to selectively either transmit torque up to a particular transmittable torque value or to prevent substantial torque transmission.

BACKGROUND

Electromechanical actuators (EMA), such as those used for flight control surfaces are often required to be connected or disconnected from their mechanical inputs dependent on required modes of operation, or responses to external events. This enables various mechanical functions to be connected or disconnected by switching between modes.

For example, a spoiler or aileron on an aircraft wing may be controlled by such an EMA and called an EMA spoiler or an EMA aileron accordingly.

Devices which selectively transmit torque may be used to between the inputs and outputs of such EMAs. These devices are typically operated by use of a solenoid and act in a similar manner to a clutch, by loading or unloading axial load paths through the device to transmit torque or allow free rotation without transmitting torque respectively. Some examples of previous devices are illustrated in FIGS. 2A to 2C. However, performance could be improved over these examples as discussed below.

It is desirable to provide a compact device that is able to transmit high torque with a small solenoid. It is desirable that such a device does not transmit too high a torque when in a mode intended not to transmit torque and that the device does not deteriorate, leading to loss of performance, over a certain time frame.

SUMMARY

From a first aspect, there is provided a device for selectively transmitting torque between an input shaft and an output shaft. The device includes a first plurality of friction disks, a second plurality of friction disks, a plurality of roller disks, a first resilient member and a solenoid. The first plurality of friction disks are configured to rotate with the input shaft. The second plurality of friction disks are configured to rotate with the output shaft and are interdigitated with the first plurality of friction disks. Each of the plurality of roller disks includes a first disk-to-roller interface with one of the first plurality of disks and a second disk-to-roller interface with one of the second plurality of disks. The first resilient member is configured to provide an axial load through the first and second plurality of friction disks and roller disks. The solenoid is configured to overcome the force from the first resilient member when energised. The device is configured to be selectively placed in one of a first mode and a second mode, wherein the solenoid is energised in one of the first mode and the second mode and not energised in the other of the first mode and the second mode. In the first mode, a first axial load path through the device configured to transmit torque below a first transmittable torque threshold is provided through each of the first and second disk-to-roller interfaces. In the second mode, a second axial load path through the device configured to transmit torque below a second transmittable torque threshold is provided through third disk-to-disk interfaces between the disks of the first plurality of friction disks and corresponding disks of the second plurality of friction disks and through each of the first and second disk-to-roller interfaces. The second transmittable torque threshold is greater than the first transmittable torque threshold.

In some examples, the solenoid may be energised in the first mode and not energised in the second mode.

In some examples, the first axial load path may include a pair of load paths acting in parallel.

In some examples, the device may include a first spacer configured to rotate with the first plurality of friction disks and a second spacer configured to rotate with the second plurality of friction disks, wherein, in the first mode, the first axial load path extends through the spacers.

In some examples, the device may include a set of first splined connections between each of the first plurality of friction disks and the input shaft and a second set of splined connections between each of the plurality of second friction disks and the output shaft.

In some examples, the first plurality of friction disks may be carbon friction disks.

In some examples, the second plurality of friction disks may be steel friction disks.

In some examples, the first resilient member may include a Belleville spring.

In some examples, each of the plurality of roller disks may include needle thrust bearings.

From another aspect, there is provided an assembly that includes an input shaft, an output shaft and the device of any of the above. The device is configured to selectively transmit torque from the input shaft to the output shaft.

In some examples, part of the input shaft may be disposed concentrically within part of the output shaft.

From another aspect, there is provided an aircraft wing that includes a flight control surface and the assembly of either of the above. The output shaft is configured to actuate the flight control surface.

From another aspect, there is provided an aircraft including the aircraft wing of the above.

From another aspect, there is provided a method of selectively transmitting torque from an input shaft to an output shaft using the device of any of the above. The method includes: rotating an input shaft to provide a torque above a first transmittable torque threshold and below a second transmittable torque threshold; in a first mode: energising the solenoid to create a first axial load path through the device, wherein the first axial load path through which torque may be transmitted passes through only the disk-to-roller interfaces; and allowing rollers in the roller disks to roll so as to substantially not transmit the torque from the input shaft to the output shaft; and in a second mode: not energising the solenoid to create a second axial load path through the device, wherein the second axial load path through which torque may be transmitted passes through disk-to roller interfaces and disk-to-disk interfaces; and the disk-to-disk and disk-to-roller interfaces cumulatively transmitting the torque from the input shaft to the output shaft.

From another aspect, there is provided a method of controlling a flight control surface on an aircraft wing including the method of the above. Transmitting torque from the input shaft to the output shaft deploys or retracts the flight control surface.

BRIEF DESCRIPTION OF DRAWINGS

Various embodiments of this disclosure will now be described by way of example only, with reference to the accompanying drawings in which.

DETAILED DESCRIPTION OF DRAWINGS

Figure 1:
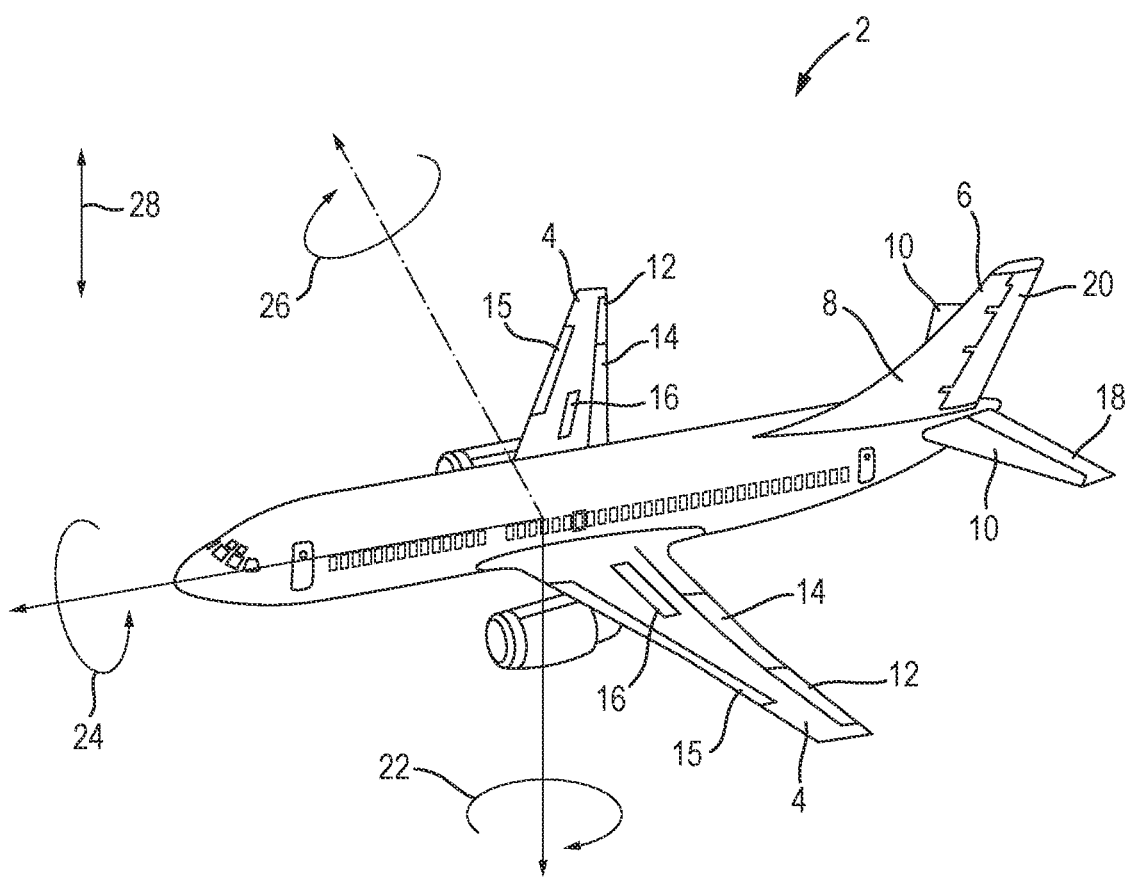
FIG. 1 illustrates an aircraft in which the device may be used.

With reference to FIG. 1, there is described an aircraft 2 in which the torque transmission device is used. The aircraft 2 includes wings 4 and a tail assembly 6 including a vertical stabiliser 8 and horizontal stabilisers 10.

The illustrated wings 4 and the tail assembly 6 include flight control surfaces 12, 14, 15, 16, 18, 20 which include ailerons 12, flaps 14, slats 15, spoilers 16, elevators 18 and a rudder 20.

Together, these flight control surfaces 12-20 are extended (or deployed), retracted and adjusted as appropriate to control the yaw 22, the roll 24, the pitch 26, and the lift 28 of the aircraft 2 when in flight by the interaction of the flight control surfaces 12-20 with the airflow.

The flight control surfaces 12-20 are controlled by the action of respective electromechanical actuators, which may include a motor and a gearbox. These actuators provide rotary motion as their output, which is connected to the respective flight control surface 12-20. These actuators may be suitable for use on thin wing configurations.

In some circumstances, there is a requirement to allow torque to be transmitted from the actuator to the flight control surfaces 12-20, and in other circumstances, there is a requirement to limit the torque transmitted from the actuator to the flight control surfaces 12-20. To this end, a torque transmission device 30 (not shown in FIG. 1) is provided on the input of each flight control surface 12-20. The torque transmission device 30 may selectively limit the torque transmitted or allow higher torque to be transmitted under the control of a solenoid 56 (not shown in FIG. 1).

Figure 2A:
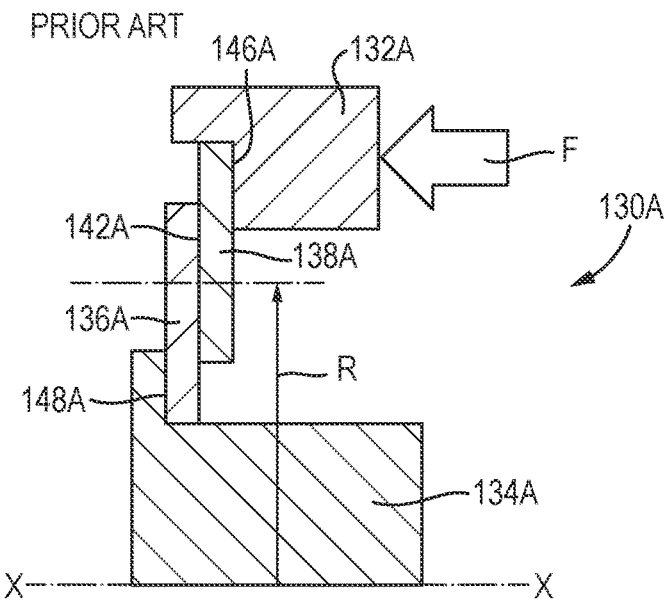
FIGS. 2A to 2C illustrate prior art devices for selectively transmitting torque.
Figure 2B:
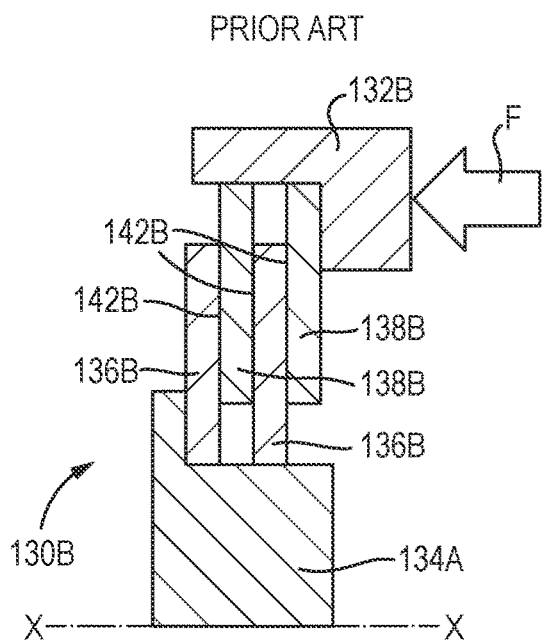
Figure 2C:
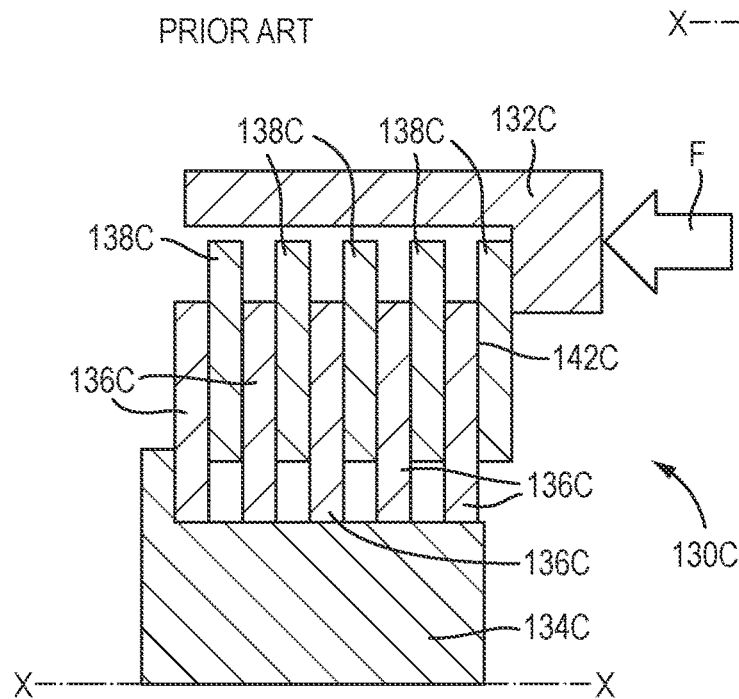

With reference to FIGS. 2A, 2B and 2C, some prior torque transmission devices 130A, 130B, 130C are illustrated.

FIG. 2A shows a device 130A acting between an input shaft 132A and an output shaft 134A configured to rotate about longitudinal axis X. As illustrated, a part of the input shaft 132A is arranged concentrically about the output shaft 134A. the input shaft 132A may thus also be referred to as an outer shaft and the output shaft 134A as an inner shaft. It should be understood that in alternative arrangements the output shaft could be the outer shaft and the input shaft could be the inner shaft.

The device 130A includes an inner disk 136A and an outer disk 138A. The inner disk 136A is configured to rotate about longitudinal axis X with the output shaft 134A (inner shaft) and the outer disk 138A is configured to rotate about the longitudinal axis X with the input shaft 132B (outer shaft). Typically, the inner disk 136A is carbon based, such as a typical carbon friction disk, and the outer disk 138A is steel; however, alternative materials may be used.

A contact interface 142A is provided between the inner disk 136A and the outer disk 138A where axial faces of each disk 136A, 138A contact each other.

The input shaft 132A includes an input shoulder 146A which provides an axial load path between the input shaft 132A and the outer disk 138A. The output shaft 134A includes an output shoulder 148A which provides an axial load path between the output shaft 134A and the inner disk 136A.

A torque may be transmitted from the outer disk 138A to the inner disk 136A (or vice versa) through the contact interface 142A. The transmittable torque depends on: a mean radius R of the contact interface 142A; a load force F; and a coefficient of friction u at the contact interface 142A. The mean radius R depends on the geometry of the disks 136A, 138B. A solenoid (not illustrated here) acting on the input shaft (or alternatively on the output shaft) controls the size of the load force F. The load force F is adjusted by energising or not energising the solenoid to respectively provide a high load force F or a low load force F. The coefficient of friction u depends on the materials used for the disks 136A, 138A, the size of the contact interface 142A and the roughness of the axial surfaces of the disks 136A, 138A at the contact interface.

As an example, with a mean radius, R of 30 mm, a coefficient of friction $\mu$ of 0.15 and a load force F of 150 N, with the solenoid energised/on, the transmittable torque of the arrangement of FIG. 1 is 0.63 Nm. In the fame example, but with the solenoid de-energised/off, and an estimated load force of 10 N, the transmittable torque is 0.05 Nm. The transmittable torque even with the solenoid on is considered to be too low for certain operations.

Torques higher than the transmittable torque result in one disk slipping against the other, and therefore not transmitting torque from the input shaft 132A to output shaft 134A.

The arrangement of FIG. 2B is similar to the arrangement of FIG. 2A, except that instead of a single inner disk 136A and a single outer disk 138A, a pair of inner disks 136B and a pair of outer disks 138B are provided and interdigitated between one another. Rather than a single contact interface 142A, this arrangement therefore provides three contact interfaces 142B between the inner and outer disks 136B, 138B. All the other components of the torque transmission device 130B of FIG. 2B are the same as that of FIG. 2A.

This arrangement, with a mean radius R of 30 mm, and with coefficients of friction u between the disks 136B, 138B of 0.15, and the same load forces of 150 N with the solenoid on and 10 N with the solenoid off would provide a transmittable torque of 2.03 Nm with the solenoid on and 0.14 Nm with the solenoid off.

However, over time, a glazing effect, or a polishing effect of the axial surfaces of the disks 136B, 138B can occur. This effect arises from the disks 136B, 138B spinning while in contact with one another, which occurs when the solenoid is turned off such that substantially torque is not transmitted. The axial surfaces of the disks rub against each other, and abrade protrusions and surface roughness, to thereby provide a smooth, polished surface. This smooth surface results in a smaller coefficient of friction u at the contact interfaces 142B. In the example above, the coefficient of friction u may, for example, be reduced to 0.05. With such a reduced coefficient of friction u, the transmittable torque would be reduced, in the present example, with the solenoid on, to 0.68 Nm. Again, this may be considered as too small for certain applications.

To compensate for this, it is possible to configure a device 130C as shown in FIG. 2C, by providing even more disks. The example in FIG. 2C includes five inner disks 136C and five outer disks 138C, which thereby provides nine contact interfaces 142C.

The device 130C with ten disks 136C, 138C in total, with the exemplary load forces F (of 150N or 10 N when the solenoid is respectively on or off), mean radius R and coefficients of friction µ (0.15 before the glazing effect, 0.05 with the glazing effect), results in a transmittable torque before glazing (with the solenoid on) of 6.08 Nm, a transmittable torque after glazing (with the solenoid on) of 2.03 Nm, and a transmittable torque before glazing (with the solenoid off) of 0.41 Nm. This transmissible torque with the solenoid off (before glazing) is too high for certain applications. Moreover, the overall length of the device 142C is relatively large, which may be undesirable in certain applications.

The present invention provides a device for selectively transmitting torque which mitigates the effects of glazing and yet provides acceptably high transmittable torque in a torque transmission mode (first mode) and acceptably low transmittable torque in a rolling mode (second mode).

Figure 3:
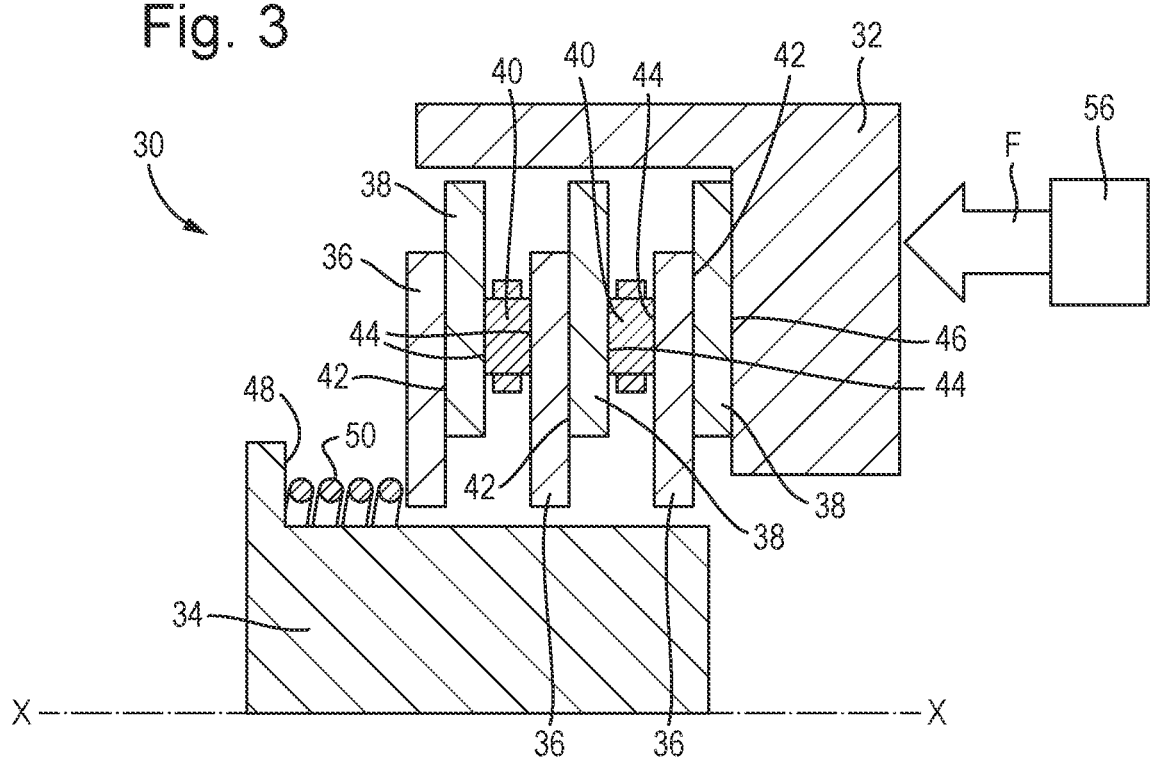
FIG. 3 illustrates a conceptual view of a device for selectively transmitting torque in accordance with the disclosure.

This device 30 for selectively transmitting torque is conceptually illustrated in FIG. 3.

This device 30 includes an input shaft 32 and an output shaft 34, each of the input shaft 32, 34 being rotatable about a central longitudinal axis X. As will be appreciated, though shown in cross section, the input shaft 32 and output shaft 34, together with the other illustrated components, are annular or cylindrical around the central longitudinal axis X.

In the illustrated arrangement, a portion of the input shaft 32 is disposed concentrically around a portion of the output shaft 34. As will be appreciated, the input shaft and the output shaft could be arranged alternatively to dispose a portion of the input shaft concentrically within a portion of the output shaft.

The input shaft 32 provides an input shoulder 46 facing axially toward the output shaft 34 and the output shaft 34 provides an output shoulder 48 facing axially toward the input shaft 32. A space is therefore defined bounded by the input shaft 32, the output shaft 34, the input shoulder 46 and the output shoulder 48, in which a torque transmission device 30 is provided.

The torque transmission device 30 includes a plurality of inner disks 36, which are associated with the output shaft 34 and configured to rotate with the output shaft 34. These inner disks 36 are friction disks and may be called second friction disks. In some arrangements, these inner disks 36 are carbon-based friction disks 36.

The torque transmission device 30 also includes a plurality of outer disks 38, which are associated with the input shaft 32 and configured to rotate with the input shaft 32.

The inner and outer disks 36, 38 are interdigitated with one another (with roller disks also between some of the disks as discussed below). In this manner a number of disk-to-disk interfaces 42 are formed, where one of the inner disks 36 contacts one of the outer disks 38 and through which, when a load is applied, a torque may be transmitted through the disk-to-disk contact, vis frictional forces. The size of the torque which may be transmitted is proportional to the load applied, and also proportional to a mean radius of the disk-to-disk contact, and a coefficient of friction of the interface.

In alternative arrangements, the inner and outer disks 36, 38 may be swapped so that the outer disks 38 rotate with the output shaft 34 and the inner disks 36 rotate with the input shaft 32. Also, the outer disks 38 may be carbon-based friction disks and the inner disks 36 steel based friction disks, or any combination thereof.

In the illustrated arrangement, three inner disks 36 and three outer disks 38 are shown as this has been found to provide the desired characteristics for the device; however, it will be appreciated that a different number of disks 36, 38 may be provided in alternative devices.

The device 30 also includes a plurality of roller disks 40, a pair of said roller disks 40 in the illustrated arrangement. These roller disks 40 may be made of needle roller thrust bearings. That is, an annular arrangement of rollers or needles, held in a carrier structure such that the needles or rollers may each individually rotate about their own longitudinal axis, which extends in a radial direction with respect to the central longitudinal axis X. By the individual rotations of each needle or roller, the carrier structure, or roller disk 40 as a whole, may slide and rotate against an axially adjacent component. As a result, each of the roller disks 40 operates as a disk with a very low, for example below about 0.02 coefficient of friction, u, at interfaces between the roller disk 40 and adjacent friction disks 36, 38 as compared to the friction disks. These interfaces between the roller disks 40 and the friction disks 36, 38 may be called roller-to-disk interfaces 44.

The device 30 also includes a resilient member 50, which may be a Bellville spring, or another kind of spring or set of springs, and also a solenoid 56.

The solenoid 56 may be energised to provide a load force F, or not energised (deenergised/de-energised) to not provide a force, and instead allow the device 30 to function as driven by a force from the resilient member 50.

The solenoid 56 and resilient member 50 may be arranged in any manner such that the device 30 may be switched between a first mode and a second mode dependent on whether of not the solenoid 56 is energised.

Additional components, such as spacers (not shown in FIG. 3) may be included to enable the necessary operation to provide the necessary modes of operation.

Torque may be transmitted through an axial load path from the input shaft 32 to the output shaft 34, provided the torque is below a relevant torque threshold. Above the torque threshold, the frictional forces which act to transmit the torque across the interfaces under load, are overcome, and the interfaces 42, 44 slip and thus slide or roll as appropriate. Accordingly, if the torque applied by the input shaft is above the relevant torque threshold, the torque will not be transmitted, or only the part of the torque below the torque threshold will be transmitted. In practice, slightly less torque than the torque threshold would be transmitted when the torque threshold is exceeded because dynamic coefficients of friction are typically higher than static coefficients of friction for the same materials.

In the first mode, the solenoid 56 and resilient member 50 cooperate to ensure that the axial load path (first axial load path) from the input shaft 32 to the output shaft 34 only passes through the disk-to-roller interfaces 44, and not through the disk-to-disk interfaces 42. When in this mode, the axial load may pass through interfaces between components that already rotate with one another. For example, the axial load passes from the input shaft 32 through the input shoulder 46 to one of the outer disks 38. Similarly, the load could pass from one of the outer disks 38 to another of the outer disks 38. However, the load path does not pass from any of the outer disks 38 directly to one of the inner disks 36.

This results in a low torque threshold (the first torque threshold). Using the example above, with a force of 150 N, a mean radius of 30 mm, and a coefficient of friction of the disk-to-roller interfaces of 0.02, the torque threshold in this mode is 0.09 Nm.

By using the roller disks 40 in this mode, in the cases where the input torque exceeds the torque threshold, the rollers within the roller disk 40 roll, rather than sliding, and so there is no glazing or polishing effect, which could otherwise drastically reduce the coefficient of friction in the disk-to-disk interfaces 42. The disk-to-disk interfaces 42 include a gap between the inner and outer disks 36, 38 in this first mode.

In the second mode, the solenoid 56 and resilient member 50 cooperate to ensure that the axial load path (second axial load path) extends through each of the disk-to-disk interfaces 42 and, optionally, through the disk-to-roller interfaces 44.

In this mode, the frictional forces acting between the inner and outer disks 36, 38 through the disk-to-disk interfaces provide the required transmittable torque threshold. In the illustrated arrangement, there are three disk-to-disk interfaces through with torque may be transmitted, which leads to, using the same example (of F=150 N, R=30 mm, µ=0.15) as above, a (second) transmittable torque threshold of 2.03 Nm.

As explained above, due to the absence of the glazing effects in the first mode, this second torque threshold will not deteriorate and degrade over time in the same way as the arrangements of FIGS. 2A to 2C would.

Figure 4A:
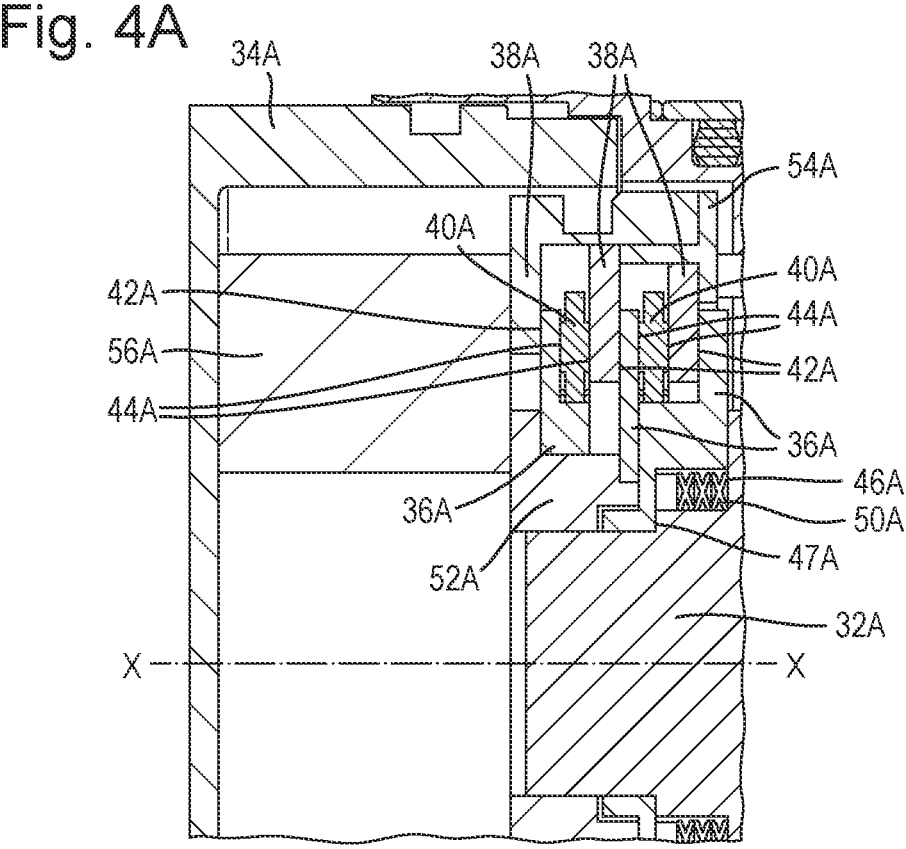
FIGS. 4A to 4C illustrate a device in accordance with an embodiment, and different load paths in different modes thereof.
Figure 4B:
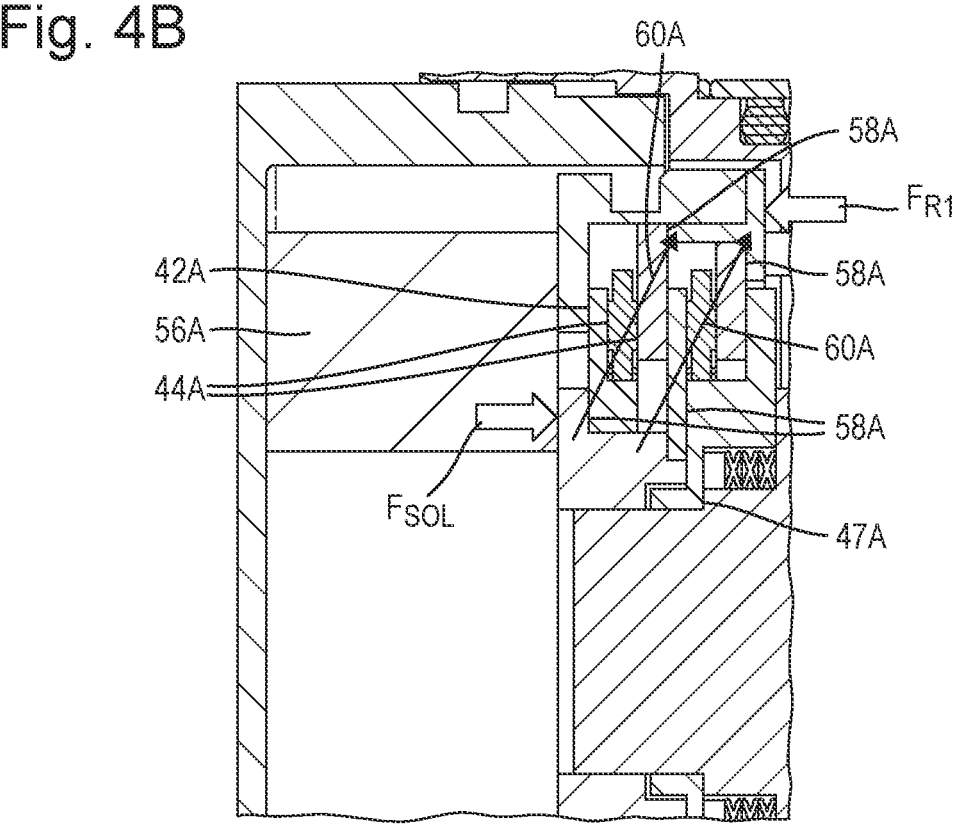
Figure 4C:
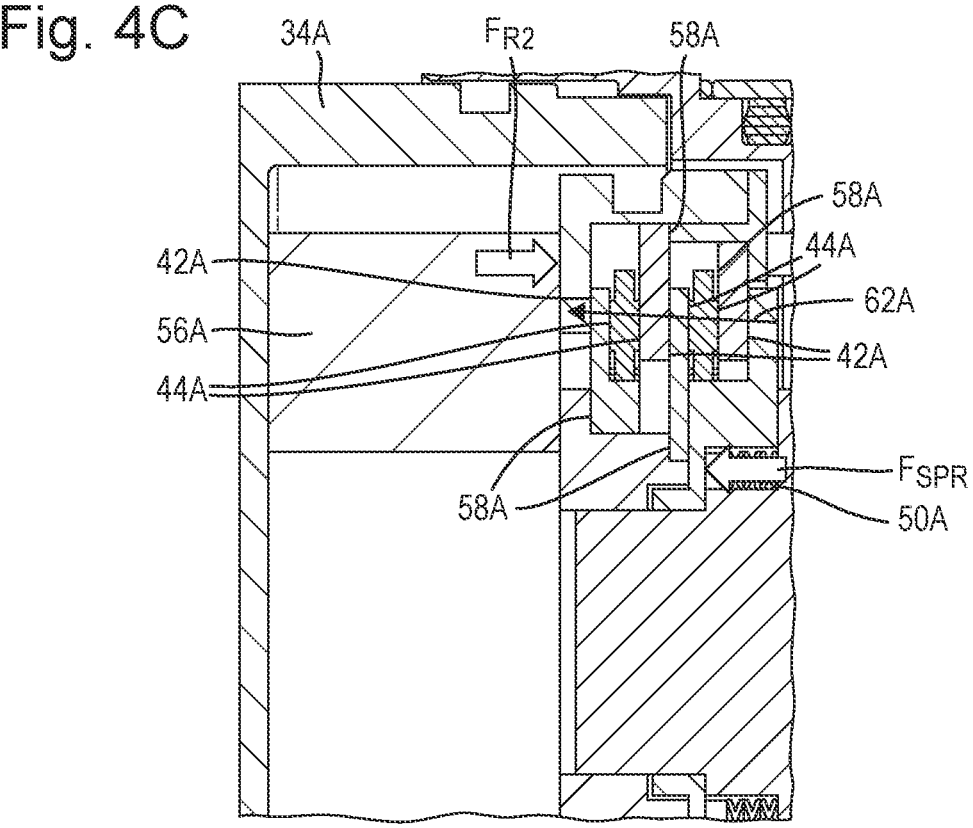
Figure 5A:
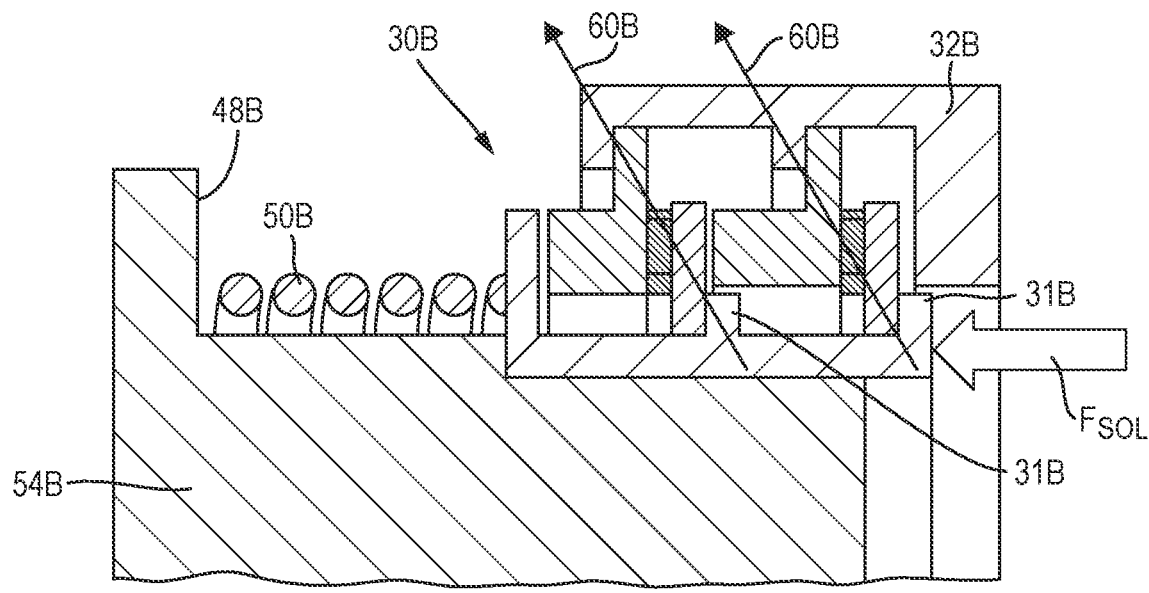
FIGS. 5A and 5B illustrate a device in accordance with another embodiment, showing different load paths in different modes thereof.
Figure 5B:
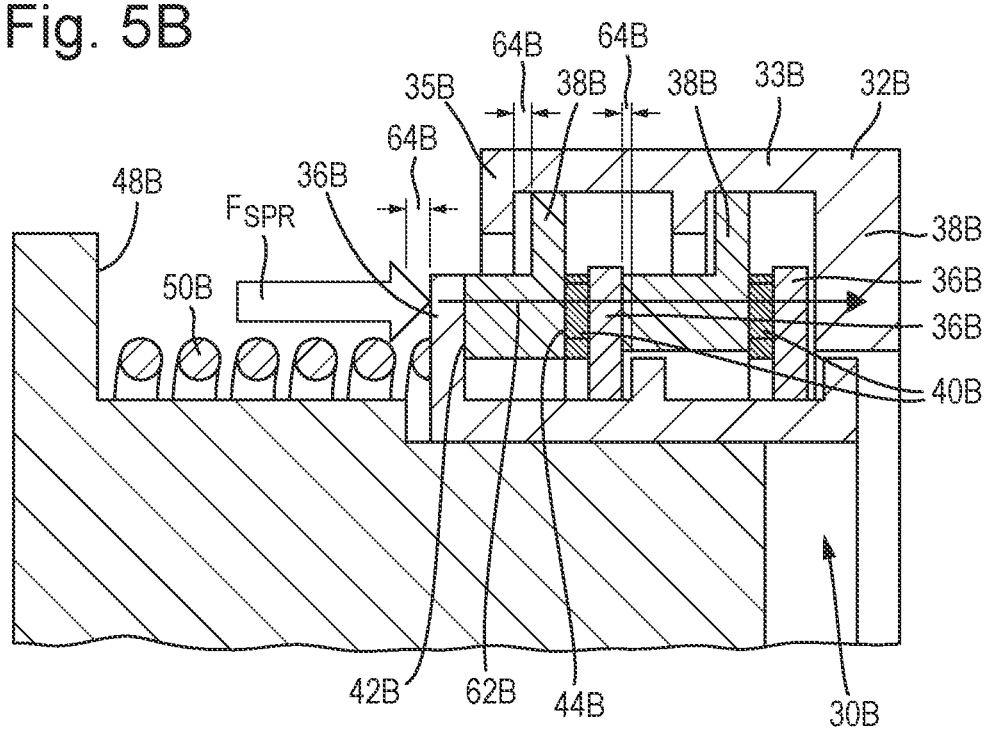

Now described with reference to FIGS. 4A to 4C and then FIGS. 5A to 5B, are two exemplary arrangements which achieve the torque transmission modes as discussed conceptually above.

Like features are designated with like reference numerals, but with a letter added. For example, the device of FIG. 4A in indicated as device 30A, as compared to device 30 shown in FIG. 3.

The device 30A includes substantially similar elements to the device 30, but the input shaft 32A and output shaft 34A are reversed such that a part of the input shaft 32A is concentrically within a part of the output shaft 34A. In addition to the input shoulder 46A, for receiving the resilient member 50A, input shaft 32A also includes a secondary input shoulder 47A for receiving a part of one of the inner disks 36A. A number of the inner and outer disks 36A, 38A are shaped differently to the simple flat annular surfaces of FIG. 3, having protrusions, rims, and other such features to form load paths as necessary in each mode as described below. The device also includes spacers 52A, 54A, in particular an outer spacer 54A configured to rotate with the output shaft 34A and an inner spacer 52A configured to rotate with the input shaft 32A.

In further detail, the forward inner friction disk 36A (or axially forwardmost, on the left-hand-side of FIG. 4A) includes a hub portion and a narrower flange portion extending radially outwardly with respect to the longitudinal axis X form the hub portion at a forward side thereof. The hub portion provides a radially inward support for the axially forwardmost roller disk 40A.

The middle inner friction disk 36A has a flat annular disk shape, having an outer radius equal to an outer radius of the forward inner friction disk 36A, and an inner radius less than an inner radius of the forward inner friction disk 36A.

The aft inner friction disk 36A (or axially aftmost, on the right-hand-side of FIG. 4A) has a central hub portion with a radially outwardly extending flange portion extending from an aft side of the central hub portion, and also having a radially inwardly extending flange portion extending from a forward side of the central hub portion. The radially inwardly extending flange portion further includes an axially extending annular portion extending forward from the radially innermost part of the radially inwardly extending flange portion. The central hub portion provides a radially inward support to the aftmost roller disk 40A.

The aft outer friction disk 38A and the middle outer friction disk 38A each have a flat annular disk shape.

The forward outer friction disk 38A (or axially forwardmost, on the left-hand-side of FIG. 4A) has a generally L-shape cross section having an annular hub portion at a radially outer extent, with a cut-out or groove extending annularly around the hub portion, and extending radially inward from a forward side of the hub portion the forward outer friction disk 38A also has a narrower flange portion. The annular hub portion of the forward outer friction disk 38A provides a radially outer support for the middle outer friction disk 38A and may have a splined connection between the two. The splined connections (both here and described elsewhere) could be direct or indirect, i.e., through other components, such as other disks or spacers, and other types of rotational connections could also be provided.

The inner spacer 52A has a generally L-shaped cross section, but with different axial lengths for different portions of the radially inward part of the L. That is, the inner space 52A had an annular hub portion and a radially outwardly extending flange portion extending from the axial forward part of the hub portion. The hub portion is axially flush on a forward side with outwardly extending flange portion and has a first, smallest axial length at a radially inner part, a second, largest axial length at a radially middle part and a third, intermediate axial length at a radially outer part. The radially outwardly extending flange portion provides a seat for the forward inner friction disk 36A. The radially outer part of the hub portion provides a seat for the middle inner friction disk 36A and the radially middle part of the hub portion provides a seat for the aft inner friction disk 36A.

The outer spacer 54A has a sideways T-shaped cross-section. That is, the outer spacer 54A has an annular hub portion and a pair of flange portions extending respectively radially outwardly and radially inwardly from an aft side of the hub portion. The inwardly extending flange portion provides a seat for the aft outer friction disk 38A and the outwardly extending flange portion provides a seat for the hub portion of the forward outer friction disk 38A.

Forward is defined herein as toward the side of the output shaft, and aftward is toward the side of the input shaft.

Illustrated in FIG. 4B is the arrangement of FIG. 4A in the first mode. In the first mode, the solenoid is energised, and thus provides a solenoid force FSOL. The solenoid force provides an axial load path 60A, which comprises in this arrangement a pair of parallel axial load paths 60A. The parallel load paths are parallel insofar as they share the load between each path. They incidentally have a parallel geometry as well. The forward of the pair of axial load paths 60A passes from the solenoid to the inner spacer 52A, through a spacer-to-disk interface 58A to the forwardmost inner friction disk 36A, through a roller-to-disk interface 44A to the forward roller disk 40A, through another roller-to-disk interface 44A to the middle outer disk 38A, through a spacer-to-disk interface 58A to the outer spacer 54A and then to an input shaft structure that provides a reaction force FR1 to the solenoid force FSOL. The aft of the pair of axial load paths 60A passes from the solenoid to the inner spacer 52A, through a spacer-to-disk interface 58A to the middle inner friction disk 36A, through a roller-to-disk interface 44A to the aft roller disk 40A, through another roller-to-disk interface 44A to the aft outer disk 38A, through a spacer-to-disk interface 58A to the outer spacer 54A and then to an input shaft structure that provides the reaction force FR1 to the solenoid force FSOL.

In this way, the interfaces through which torque may be transmitted in the first mode are only the roller-to-disk interfaces, because the other interfaces through which the load paths 60A travel are interfaces between components already rotating at the same speed as each other, with either the input or output shaft respectively. Accordingly, the transmittable torque in this mode is low, as discussed above.

In the first mode, the aft inner disk 36A abuts the input shoulder 47A.

The second mode is illustrated in FIG. 4C. In this mode, the solenoid is not energised, and so the resilient member 50A provides the main force for the axial load path. There is a short stroke length (less than about 0.4 mm) of a number of the disks and spacers which ensures the load path travels through the desired interfaces. This short stroke length ensures that the solenoid can work more efficiently, which results in a smaller solenoid being required than would otherwise be the case.

In the second mode a single axial load path 62A is provides. This load path 62A passes from the force FSPR provided by the resilient member 50A and to the aft inner friction disk 36A. The load path 62A then passes through a disk-to-disk interface 42A to the aft outer friction disk 38A, then through a roller-to-disk interface 44A to the aft roller 40A, then through another roller-to-disk interface 44A to the middle inner friction disk 36A, then through a disk-to-disk interface 42A to the middle outer friction disk 38A, then through a roller-to-disk interface 44A to the forward roller 40A, then through another roller-to-disk interface 44A to the forward inner friction disk 36A, then through a disk-to-disk interface 42A to the forward outer friction disk 38A then to an outer shaft structure providing a reaction force FR2 to the resilient member force FSPR.

In this manner, the axial load path 62A passes through disk-to-disk interfaces 42A as well as the roller-to-disk interfaces 44A and thereby may transmit a higher torque from the input shaft 32A to the output shaft 34A.

An alternative arrangement is illustrated in FIGS. 5A and 5B, which, instead of using spacers as illustrated with reference to FIGS. 4A to 4C, uses disks that have features acting as spacers and disks being an integral part of the outer shaft 34B.

The input shaft 32B in this arrangement is arranged concentrically about the output shaft 34B.

The forward inner friction disk 36B includes a hub portion extending the full axial length of the device rearwardly from a flange portion, which provides the main part of the forward friction disk, said hub portion including rims 31B for providing axial stops for the middle and aft inner friction disks 36B respectively. The flange portion of the forward inner friction disk provides a surface for contact with the resilient member 50B and a disk-to-disk interface with a forward outer friction disk.

The aft outer friction disk 38B is provided by the outer shaft 32B (input shaft 32B). The input shaft also includes an axial extension 33B with radially inwardly extending rims 35B for retaining the middle and forward outer friction disks 38B.

The middle and forward outer friction disks 38B have a flange portion and a hub portion at a radially inner part thereof. The flange portion provides engagement, for example via a splined connection, and also via the rims 35B with the input shaft 32B and the hub portions provide the necessary axial extension between the roller disks 40B and the inner friction disks 36B adjacent to the respective outer friction disk 38B.

In the first mode, illustrated in FIG. 5A, axial load paths 60B pass through interfaces only between the roller disks 40B and respective inner and outer friction disks 36B, 38B, and through disk-to-disk interfaces between like types of inner or outer friction disks 36B, 38B. That is, the load paths, or load surfaces, through which torque may be transmitted only pass through the roller disks 40B and their adjacent friction disks 36B, 38B. As a result, only a small torque is transmittable.

In the second mode, illustrated in FIG. 5B, an axial load path 62B passes through each of the disk-to-disk interfaces between different-type disks and also through the roller-to-disk interfaces. Accordingly, a larger torque may be transmitted in the second mode.

Gaps 64B are provided between the disks 36B, 38B and rims 31B, 35B in the second mode, as a result of a stroke of the device 30B moving under the force of the resilient member 50B, with the solenoid not energised.

The load passing through the disk-to-roller interfaces 44B only in the first mode ensures that glazing effects do not occur to the disk-to-disk interfaces 42B and the coefficient of friction, and thus transmittable torque in the second mode, remains high.

As will be appreciated, variations to the examples shown and operating under the same principles herein are considered.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A device for selectively transmitting torque between an input shaft and an output shaft, comprising:
    a first plurality of friction disks configured to rotate with the input shaft;

a second plurality of friction disks configured to rotate with the output shaft and interdigitated with the first plurality of friction disks;

a plurality of roller disks wherein each of the plurality of roller disks includes a first disk-to-roller interface with one of the first plurality of friction disks and a second disk-to-roller interface with one of the second plurality of friction disks;

a first resilient member configured to provide a force (FSPR) through the first and second plurality of friction disks and roller disks; and a solenoid configured to overcome the force (FSPR) from the resilient member when energised;

wherein the device is configured to be selectively placed in one of a first mode and a second mode, wherein the solenoid is energised in one of the first mode and the second mode and not energised in the other of the first mode and the second mode, wherein:
in the first mode, a first axial load path through the device configured to transmit torque below a first transmittable torque threshold is provided through each of the first and second disk-to-roller interfaces; and in the second mode, a second axial load path through the device configured to transmit torque below a second transmittable torque threshold is provided through disk-to-disk interfaces between the disks of the first plurality of friction disks and corresponding disks of the second plurality of friction disks and through each of the first and second disk-to-roller interfaces, wherein the second transmittable torque threshold is greater than the first transmittable torque threshold.

2. The device of claim 1, wherein the solenoid is energised in the first mode and not energised in the second mode.

3. The device of claim 1, wherein the first axial load path comprises a pair of load paths acting in parallel.

4. The device of claim 1, further comprising:
a set of first splined connections between each of the first plurality of friction disks and the input shaft; and
a second set of splined connections between each of the plurality of second friction disks and the output shaft.

5. The device of claim 1, wherein the first plurality of friction disks are carbon friction disks.

6. The device of claim 1, wherein the second plurality of friction disks are steel friction disks.

7. The device of claim 1, wherein the first resilient member comprises a Belleville spring.

8. The device of claim 1, wherein each of the plurality of roller disks comprises needle thrust bearings.

9. An assembly comprising:
an input shaft;
an output shaft; and
a device according to claim 1, wherein the device is configured to selectively transmit torque from the input shaft to the output shaft.

10. The assembly of claim 9, wherein part of the input shaft is disposed concentrically within part of the output shaft.

11. An aircraft wing comprising:
a flight control surface; and
an assembly of claim 10, wherein the output shaft is configured to actuate the flight control surface.

12. An aircraft comprising:
the aircraft wing of claim 11.

13. A method of selectively transmitting torque from an input shaft to an output shaft using the device claim 1, the method comprising:

rotating an input shaft to provide a torque above a first transmittable torque threshold and below a second transmittable torque threshold;

in a first mode:
energising the solenoid to create a first axial load path through which torque may be transmitted through the device, wherein the first axial load path through which torque may be transmitted passes through only the disk-to-roller interfaces; and
allowing rollers in the roller disks to roll so as to substantially not transmit the torque from the input shaft to the output shaft; and in a second mode:
not energising the solenoid to create a second axial load path through the device, wherein the second axial load path through which torque may be transmitted passes through disk-to-roller interfaces and disk-to-disk interfaces; and
the disk-to-disk and disk-to-roller interfaces cumulatively transmit the torque from the input shaft to the output shaft.

14. A method of controlling a flight control surface on an aircraft wing including the method of claim 13, wherein transmitting torque from the input shaft to the output shaft deploys or retracts the flight control surface.

* * * * *